Sept. 17, 1963 R. KOBLER 3,104,285

TELEPHONE DIALING EQUIPMENT

Filed July 27, 1959 8 Sheets-Sheet 1

INVENTOR.
RICHARD KOBLER

BY George H. Fritzinger

AGENT

INVENTOR.
RICHARD KOBLER
BY
George H. Fritzinger
AGENT

TELEPHONE DIALING EQUIPMENT

Filed July 27, 1959 8 Sheets-Sheet 3

INVENTOR
RICHARD KOBLER
BY George H. Fritzinger
AGENT

INVENTOR
RICHARD KOBLER
BY George H. Fritzinger
AGENT

Sept. 17, 1963 R. KOBLER 3,104,285

TELEPHONE DIALING EQUIPMENT

Filed July 27, 1959 8 Sheets-Sheet 5

INVENTOR
RICHARD KOBLER

BY George H. Fritzinger
AGENT

Sept. 17, 1963 R. KOBLER 3,104,285

TELEPHONE DIALING EQUIPMENT

Filed July 27, 1959

8 Sheets-Sheet 6

INVENTOR
RICHARD KOBLER

BY George H. Fritzinger

AGENT

INVENTOR.
RICHARD KOBLER
BY George H. Fritzinger
AGENT

Sept. 17, 1963 R. KOBLER 3,104,285

TELEPHONE DIALING EQUIPMENT

Filed July 27, 1959 8 Sheets-Sheet 8

INVENTOR
RICHARD KOBLER
BY *George H. Fritzinger*
AGENT

United States Patent Office 3,104,285

Patented Sept. 17, 1963

3,104,285
TELEPHONE DIALING EQUIPMENT

Richard Kobler, West Orange, N.J., assignor to McGraw-Edison Company, Elgin, Ill., a corporation of Delaware Filed July 27, 1959, Ser. No. 829,881
19 Claims. (Cl. 179—90)

This invention relates to telephone dialing equipment. An object of the invention is to insure that sufficient time shall elapse between the dialing of successive letters and digits to permit the telephone line switching apparatus to operate.

This application covers certain features disclosed but not claimed in my pending joint application with William G. Whitney, Serial No. 784,258, filed January 31, 1958, and entitled Telephone Calling Equipment (now Patent No. 3,040,133, issued June 19, 1962).

The invention has particularly useful application and is herein described by way of preferred illustration in connection with an automatic telephone dialing mechanism such as is described in the pending Kobler et al. application just referred to. As will appear, such automatic machines have recorder-reproducer equipment capable of storing a large number of coded telephone numbers and of calling selected subscribers' numbers merely upon performing a number-selecting manipulation on the machine and then starting the same.

Letters and digits of telephone numbers in code form comprise respective pulse trains which when fed into a telephone line are recognized individually by the line switching apparatus to make proper switching connections only because they are separated by much greater time intervals than are the intervals between the successive pulses of any one train. Typically, each pulse has a duration of 60 milliseconds and each pulse train comprises a series of such pulses repeated at a rate of 10 per second, the individual pulses of any one train being thus separated by 40 milliseconds. However, successive pulse trains must be separated by interdigital periods of at least 500 milliseconds in order that the operation of the respective stepper switches in the central office by each pulse train may be completed before the next pulse train arrives.

In the manual dialing of telephone numbers interdigital periods greater than 500 milliseconds usually occur. But if a person dials rapidly the lower order letters or digits he may dial the successive digits or letters with less than the needed 500 millisecond interdigital spacing. For instance, when the digit "1" is dialed by placing the finger in the "1" position, winding up the dial through two intervals until the finger strikes against the finger rest and then releasing after the dial is released, a pulse is generated in approximately 100 milliseconds after the dial is released. A period of at least 400 milliseconds is therefore necessary between the time the pulse has been completed and the time the dial is again wound up for another digit and released. If a person dials energetically he can dial the second digit in less than such minimum 400 millisecond period.

Any such over-rapid dialing will result not only in the calling of a wrong number but will also be a costly error particularly if a long distance number is being called. Still worse, if a subscriber were to make such error when recording telephone numbers in the storage system of an automatic dial-machine, not only would the machine later call the wrong party as to that number, giving rise to a question as to whether the machine itself is operating properly or not, but after is was determined that the trouble lay in the recording of the wrong number in the first place the subscriber would have to re-record that number in the machine.

An object of the invention is to provide a telephone dialing mechanism whether merely part of a subscriber's handset or part of an automatic dialing machine with a dial lock mechanism to prevent the dialing of a successive digit until a predetermined interdigital time interval has elapsed following the dialing of a preceding digit.

A further object is to provide a novel and dependable timing mechanism for performing special timing functions in telephone dialing equipment.

In recording telephone numbers later to be reproduced selectively and fed into telephone lines to call selected subscribers' stations, the interdigital timing as well as other timing functions hereinafter described are carried out by special timing mechanism operated by the drive of the record-reproduce machine. This timing mechanism is herein referred to as the "advance clutch." When this advance clutch is activated a drive coupling is provided between a spring loaded cam and the movable carriage of the record-reproduce machine to provide a movement of the cam from its home position according to the movement of the record-reproduce head across the record medium. In the path of the cam are control-switch operating members spaced at distances from home position according to the time delays desired in operating these switches. The first of these control switches is used for interdigital timing and is set at approximately 550 milliseconds distance from home position of the cam. When a letter or digit of a telephone number is dialed by turning the dial to an operated position and then releasing the same for spring return to home position, the following events occur: (1) the drive motor is started the instant the dial is released, (2) the advance clutch is engaged and the dial is locked when the dial reaches home position, and (3) the motor is stopped, the dial lock is released and the advance clutch is itself released for return of the spring loaded cam to home position by the operation of the first interdigital switch of the advance clutch.

The foregoing mechanism is used with further controls to cause the dial mechanism to be locked at all times except when the machine is conditioned for recording. Thus, upon moving the manual record control to its operate position the dial can be wound up and released to dial any selected letter or digit, but as soon as the dial is returned to home position the dial is locked and the machine is kept running for the desired interdigital time to provide an approximate 500 millisecond interdigital space on the record. By controlling the lock on the dial so that it is kept activated during the entire time the machine is running, the subscriber is prevented from starting the dialing of a second digit until the minimum interdigital time of 500 milliseconds has elapsed. In carrying out the invention in connection with a manual dialing mechanism of a subscriber's handset it is only necessary that the lock on the dial be activated the instant the dial is returned to home position and that it have a suitably delayed release.

A further object of the invention is to provide means for locking the dial for a predetermined interval or "access time" of a duration typically of about two seconds and for providing an unrecorded track of equal duration on the record when the telephone number is being recorded. Such access time is needed following the dialing of a digit or digits adapted for making connection to a tie-line in order to allow the automatic switching apparatus to make the tie-line connection before the remaining digits of the telephone number are dialed. For example, in many closed telephone systems an outside call can be made by first dialing a predetermined digit to make a tie-line connection and then waiting for the dial tone to appear before dialing the selected subscriber's telephone number. The timing delay for the tie-line connection is made by a second control switch in the advance clutch positioned at a distance corresponding to an access time of approximately two seconds from the home position of the cam.

Automatic dialing machines are provided with reset controls which are activated after the last digit of a telephone number is dialed in order to provide a relatively long blank space on the record marking the end of the telephone number. A further object of the invention is to provide improved means for locking the dial during such reset interval and for providing a blank track on the record of a corresponding duration following the dialing of the last digit of the telephone number. The reset interval is made substantially longer than the access interval above described, it being typically about three seconds duration. The reset interval is determined by another control switch in the advance clutch positioned at a distance corresponding to the desired three second interval from home position of the cam. Operation of the reset control starts the drive motor, disables the interdigital and access switches (as well as the playback switch herein next described) and engages the advance clutch. When the reset switch is next operated by the advance clutch mechanism the drive motor is stopped, and the advance clutch cam and head carriage are returned to their home positions. The purpose of the reset interval is to restore the machine to start position within a minimum time period following the dialing of the last digit of a telephone number made only long enough to provide sufficient blank space on the record to cause the head carriage to be returned automatically to home position after the telephone number is played back. Waste of time and of space on the record is therefore avoided in the recording and playing back of telephone numbers. By maintaining the dial lock operated so long as the machine is kept running the dial cannot be inadvertently operated during the reset period.

A further object of the invention is to provide a timing control for effecting an automatic return of the head carriage to home position after a telephone number is played back. This is carried out by the third or "playback" switch of the advance clutch mechanism, which switch is set between the access switch and the reset switch typically at a distance from home position of the cam corresponding to about 2250 to 2500 milliseconds. A conditioning of the machine for playback disables the interdigital and access switches. Although the advance clutch is engaged each time the reproducer head enters into an interdigital or access space on the record during the playback operation, the advance clutch falls back to zero the instant a signal is picked up unless the blank space is of a reset duration allowing the playback switch to be operated. The automatic return of the carriage within the reset interval following the last digit of a recorded telephone number avoids the necessity for completely erasing from the record prior telephone numbers of longer duration before a following telephone number of shorter duration is recorded in its place.

Other objects and features of the invention will be apparent from the following description and the appended claims.

In the description of my invention reference is had to the accompanying drawings, of which:

Figure 1:
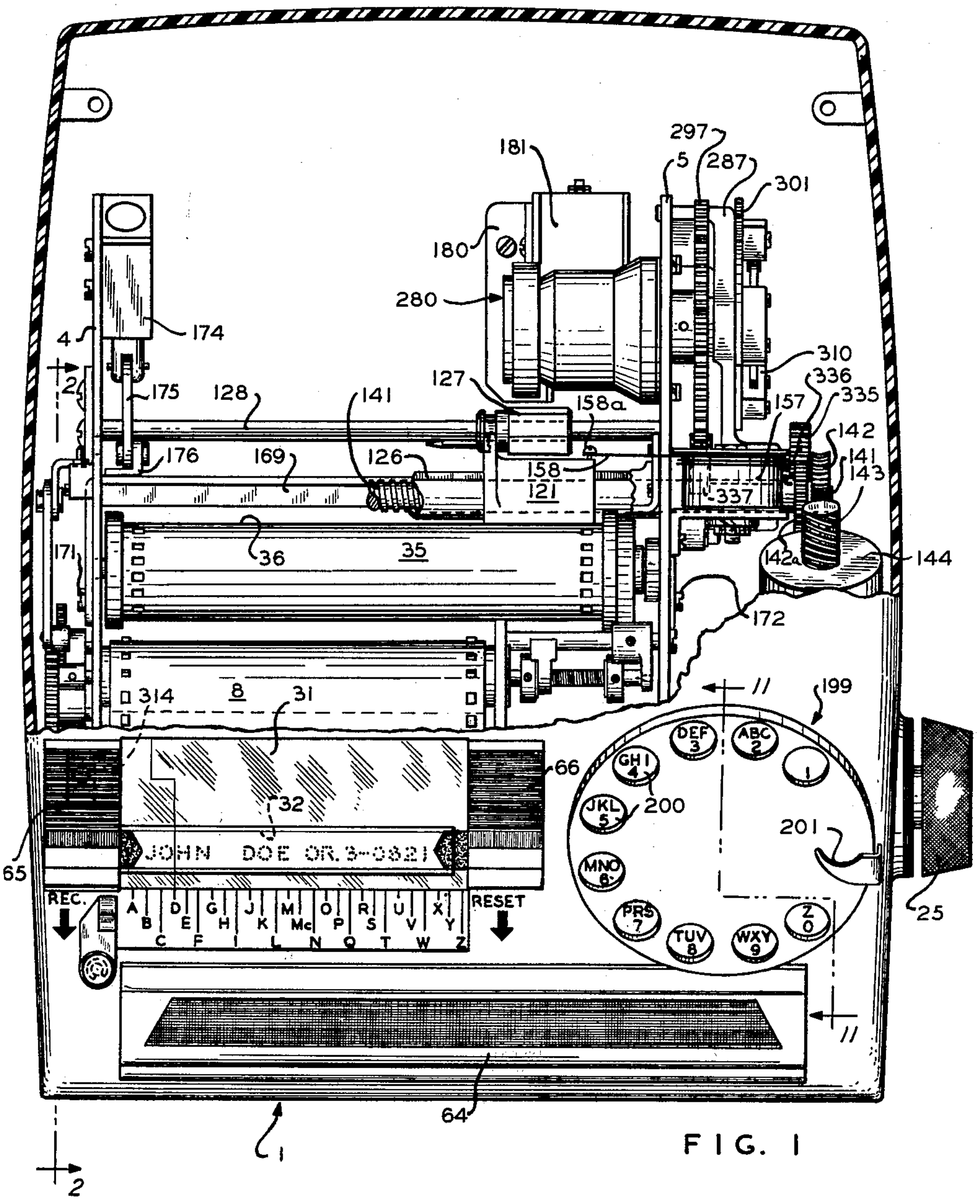
FIGURE 1 is a fractional plan view of a telephone calling machine incorporating the invention.

The automatic dialing machine in connection with which the present invention is described comprises a cabinet 1 of generally rectangular shape having a long playback control bar 64 along the front thereof, a telephone dial 199 behind the playback bar in the right half portion of the machine and a window 31 to the left of the dial for exposing to view a writing tape 8 on which are written through a slot 32 the subscribers' names whose telephone numbers are recorded in the machine. At the left and right sides of the window are respectively record and reset buttons 65 and 66.

In the rearward half of the machine there is an operating mechanism comprising a sprocket drum 36 journaled in the side frame plates 4 and 5 and across which a magnetic recording tape 35 is drawn. Back of this drum is a carriage 121 which is moved laterally across the backside of the recording tape by a feed screw 141. The carriage carries a magnetic record-reproduce head 120 (FIGURES 3 and 4) for engaging the tape to record on and reproduce therefrom transversely thereof. The writing tape 8 and recording tape 35 are shiftable longitudinally by a control knob 25 to move any selected subscriber's name in view through the slot 32 in the manner of a list finder and to bring simultaneously the track bearing the selected subscriber's telephone number in registration with the head 120. For purposes of the present invention many of the details of the present machine need not be herein described since reference may be had to the aforementioned pending application. That portion of the machine which relates particularly to the present invention is, however, herein next described in detail.

Figures 3, 4:
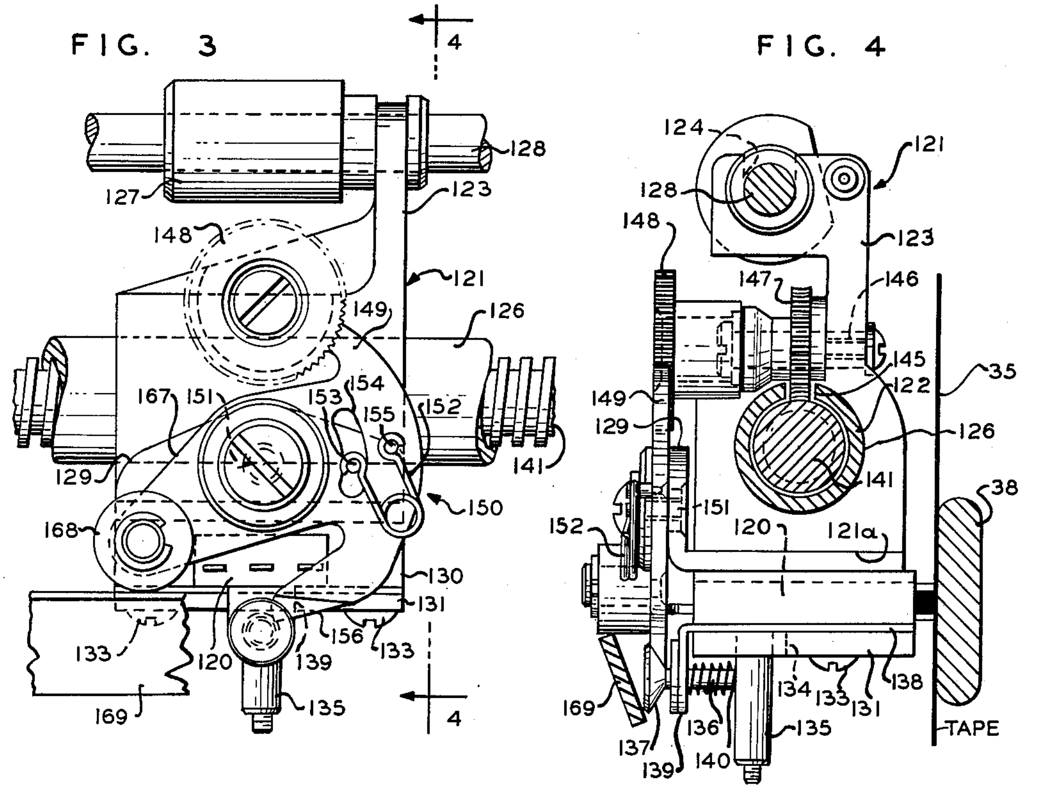
FIGURE 3 is a rearward view of the recorder-reproducer head carriage of the machine.
FIGURE 4 is a side view of the carriage as seen from the line 4—4 of FIGURE 3.

The record-reproduce head 120 is mounted slidably on the carriage 121 for movement into and out of engagement with the recording tape. The carriage is of a block shape having a large transverse bore 122 which receives slidably a tubular transverse support rod 126 mounted at its ends on the side plates 4 and 5. Also, the carriage is provided with an upstanding arm 123 having an open-ended slot 124 receiving a grooved bearing 127 as shown in FIGURE 3. This bearing slides on a transverse rod 128 mounted also on the side plates 4 and 5 to hold the carriage from turning on the support tube 126. Clamped to a bottom face 121*a* of the carriage is an L-shaped bracket plate having a lug 129 extending upwardly along the backside of the carriage, and clamped against the bracket plate is a channel bar 130 having a guideway in which is slidably mounted the head 120. The channel bar is covered by a bracket plate 138 having a lug 139 extending downwardly at the backside of the carriage. Overlying this bracket is a cover plate 131 held in place with the carriage by screws 133. The bracket plate 138 and cover plate have clearance slots 134 extending lengthwise of the guideway and through which extends a post 135 secured to the head 120. Secured to this post and extending in the direction of the guideway is a pin 136 provided with a conical head 137. The lug 139 has an opening providing a bearing for the pin 136. Interposed between the lug 139 and post 135 in surrounding relation to the pin 136 is a compression spring 140 which urges the head forwardly against the tape backed by a recording platen 38.

Figures 8, 9:
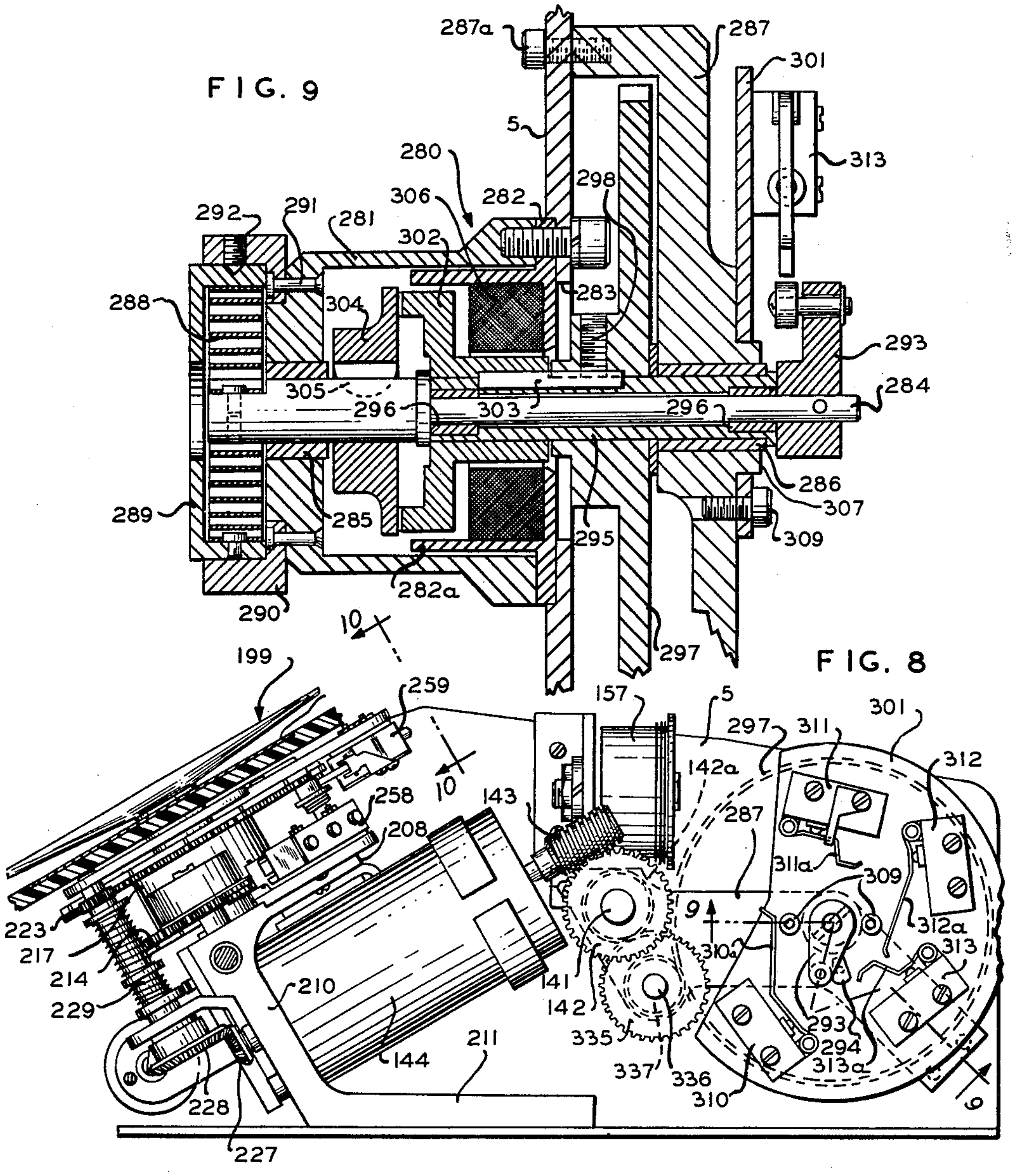
FIGURE 8 is a partial right-hand view of the machine.
FIGURE 9 is an axial section to enlarged scale taken through the advance clutch substantially on the line 9—9 of FIGURE 8.

The support tube 126 has the feed screw 141 running therethrough and journaled at its ends in bearings in the frame plates 4 and 5. The right end portion of this feed screw has a gear 142 mounted thereon and engaging a drive worm 143 of a motor 144. The motor is mounted in an inclined position at the right side of the plate 5 as shown in FIGURES 1 and 8. The supporting tube 126 has a slot 145 running lengthwise thereof through which extends a circular feed nut 147 into engagement with the feed screw. This circular feed nut is journaled on a stud 146 of the carriage and is provided with a ratchet wheel 148 engageable by a pawl 149 provided as an arm portion of a rocker plate 150. The rocker plate is mounted rotatably at the backside of the carriage on a stud 151 riveted to the bracket 129. The rocker plate is biased over center by a torsion spring 152 anchored at one end to a pin 153 mounted on the carriage and extending through a clearance slot 154 in the rocker plate, and anchored at the other end to a pin 155 on the rocker plate. An arcuate tapered cam finger 156 on the rocker plate engages the underside of the conical head 137 to lift the recorder head from the record as the rocker plate is turned clockwise from a pawl engaging position. Thus, when the rocker plate is in a counterclockwise position shown in FIGURE 3 the feed nut 147 is locked and the head 120 is in engagement with the record, and when the rocker plate is shifted clockwise the head is moved from the record and the feed nut is unlocked to allow return of the carriage to home position.

Figure 5:
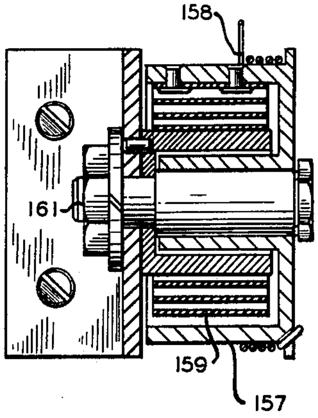
FIGURE 5 is a sectional view of a spring operated return drum for the carriage.
Figure 16:
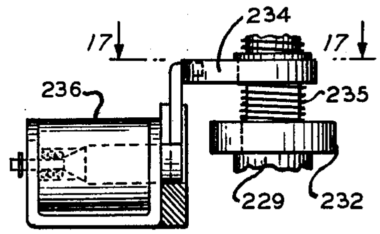
FIGURE 16 is a view of the dial solenoid taken on the line 16—16 of FIGURE 11 but showing a portion of the solenoid in section.

The carriage is driven by the feed screw 141 in a leftward direction as it appears in FIGURE 1. When the feed nut is unlocked the carriage is returned instantly to home position by a spring tensioned drum 157 on which is wound a string 158 that leads therefrom and is connected to the carriage at 158a. The drum is mounted rotatably on a shoulder stud bolt 161 and is biased by a torsion spring 159 as shown in FIGURE 5.

The rocker plate 150 has also a side arm 167 on which is journaled a roller 168. Extending crosswise of the machine below this roller is a bail 169. The bail extends through openings 170 in the side frame plates 4 and 5 and has side arms pivoted at 171 and 172 to the outer sides of these side frame plates. The bail is pivotally connected at its left side to a link 173 which is urged in the direction of the arrow 79 normally to hold the bail in a downward position. A carriage-return solenoid 174 shown in FIGURE 2 has an armature coupled by a link 175 to a lug 176 on the bail 169 to propel the bail obliquely upwardly against the roller 168 and turn the rocker plate 150 to disengage the feed nut 147 as well as to lift the recorder head from the record when the solenoid is energized. At the same time the solenoid operates through the link 173 to return the record or reproduce controls, depending on which one is operated, to a neutral position.

Figure 2:
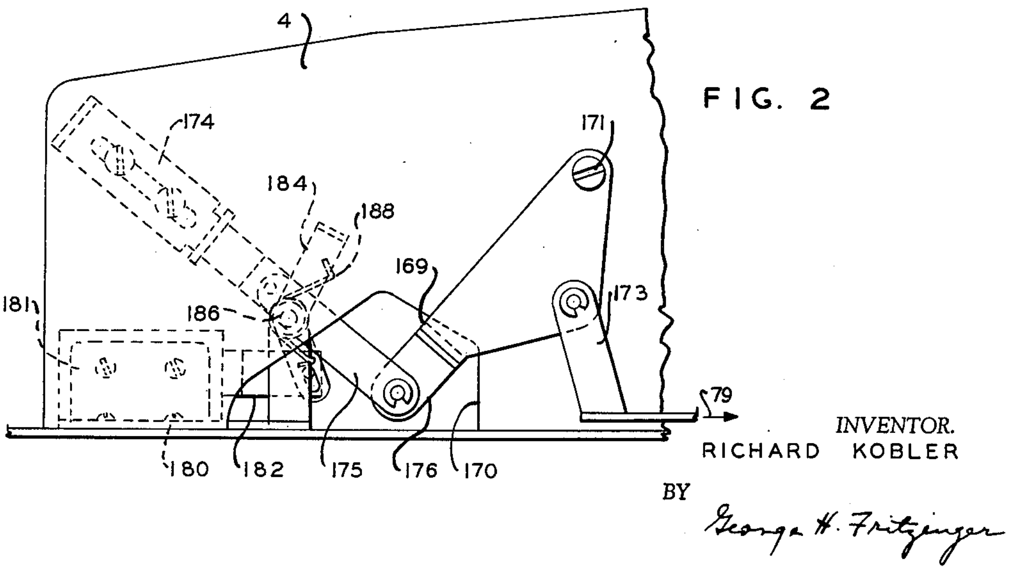
FIGURE 2 is a fractional side view of this machine taken on the line 2—2 of FIGURE 1.
Figure 6:
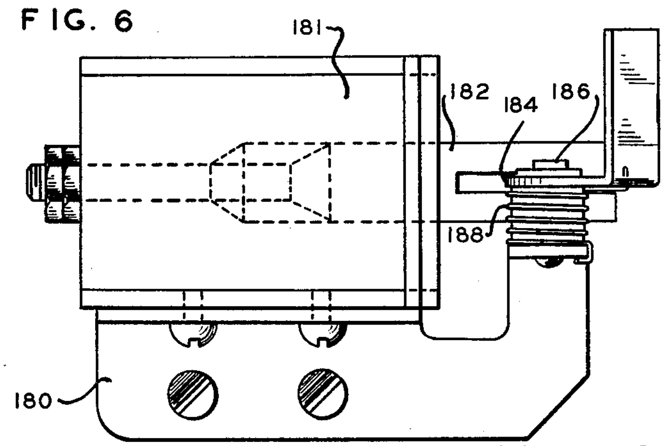
FIGURE 6 is a plan view of the clutch solenoid for the machine.

Secured by a bracket 180 to the base of the machine at the rear of the home position of the carriage is a clutch solenoid 181 shown in FIGURES 2 and 6. This clutch solenoid has an armature 182 coupled to a lever 184 which is pivoted on a stud 186 of the bracket 180. A torsion spring 188 normally holds the lever in a counterclockwise position. Upon energizing the clutch solenoid the lever 184 is propelled clockwise against the roller 168 to shift the rocker plate 150 over center whereby to return the head 150 into engagement with the record and to latch the feed nut 147.

Secured by a bracket to the side plate 5 above the home position of the carriage 121 is a switch 189 for controlling the clutch solenoid 181. This switch has a lever 190 which is operated by a bracket arm 192 on the carriage at the very end of the return movement of the carriage into its home position, the portion of the arm abutting the lever being a step 192*a*.

Figure 7:
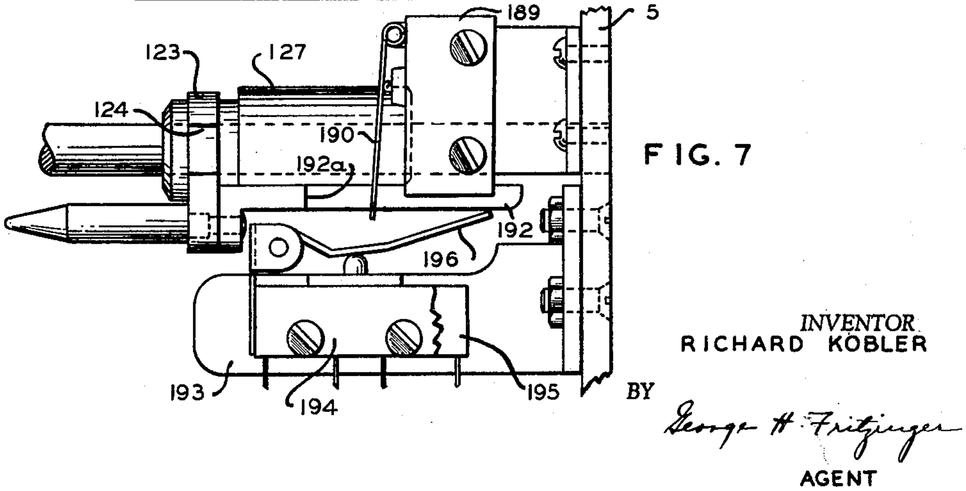
FIGURE 7 is a top plan view of certain control switches operated by the carriage as it is returned to home position.

Positioned at the front side of the home portion of the carriage on a bracket 193 of the side plate 5 are so-called mute and jog switches 194 and 195 shown in FIGURE 7. These switches are operable by common lever 196. As the carriage enters an end zone of its return movement the bracket arm 192 cams the lever 196 to operate these switches. As will appear, the jog switch 195—which is closed when the carriage is in home position—controls the carriage advance mechanism to cause the carriage to be advanced a predetermined distance when the record button is operated and the mute switch 194 serves when the playback control bar 64 is depressed to open the circuit to the dialing mechanism during the travel of the carriage through this same predetermined distance.

Figure 10:
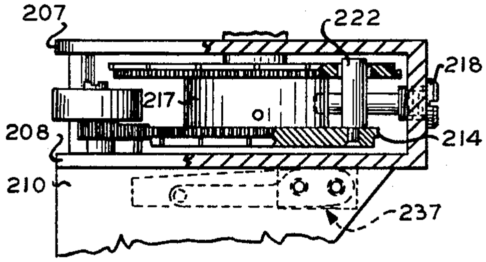
FIGURE 10 is a fractional section on the line 10—10 of FIGURE 8.
Figure 13:
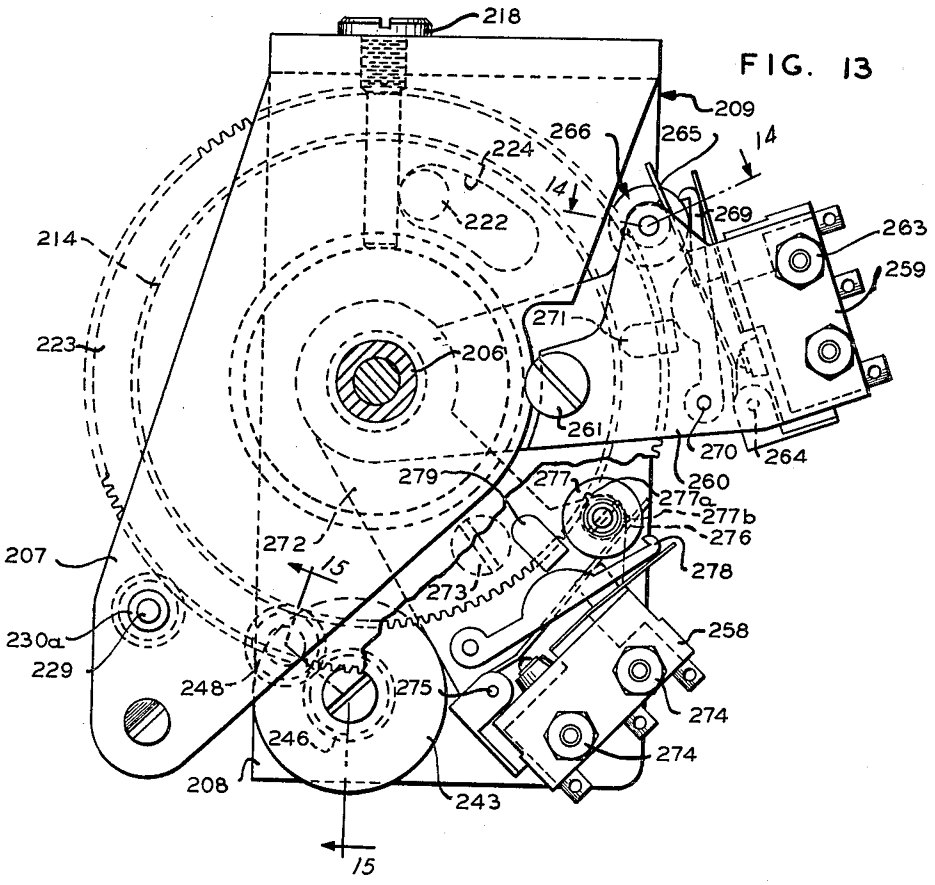
FIGURE 13 is a plan view of the dialing mechanism with parts in section on line 13—13 of FIGURE 11.
Figures 18, 19, 20:
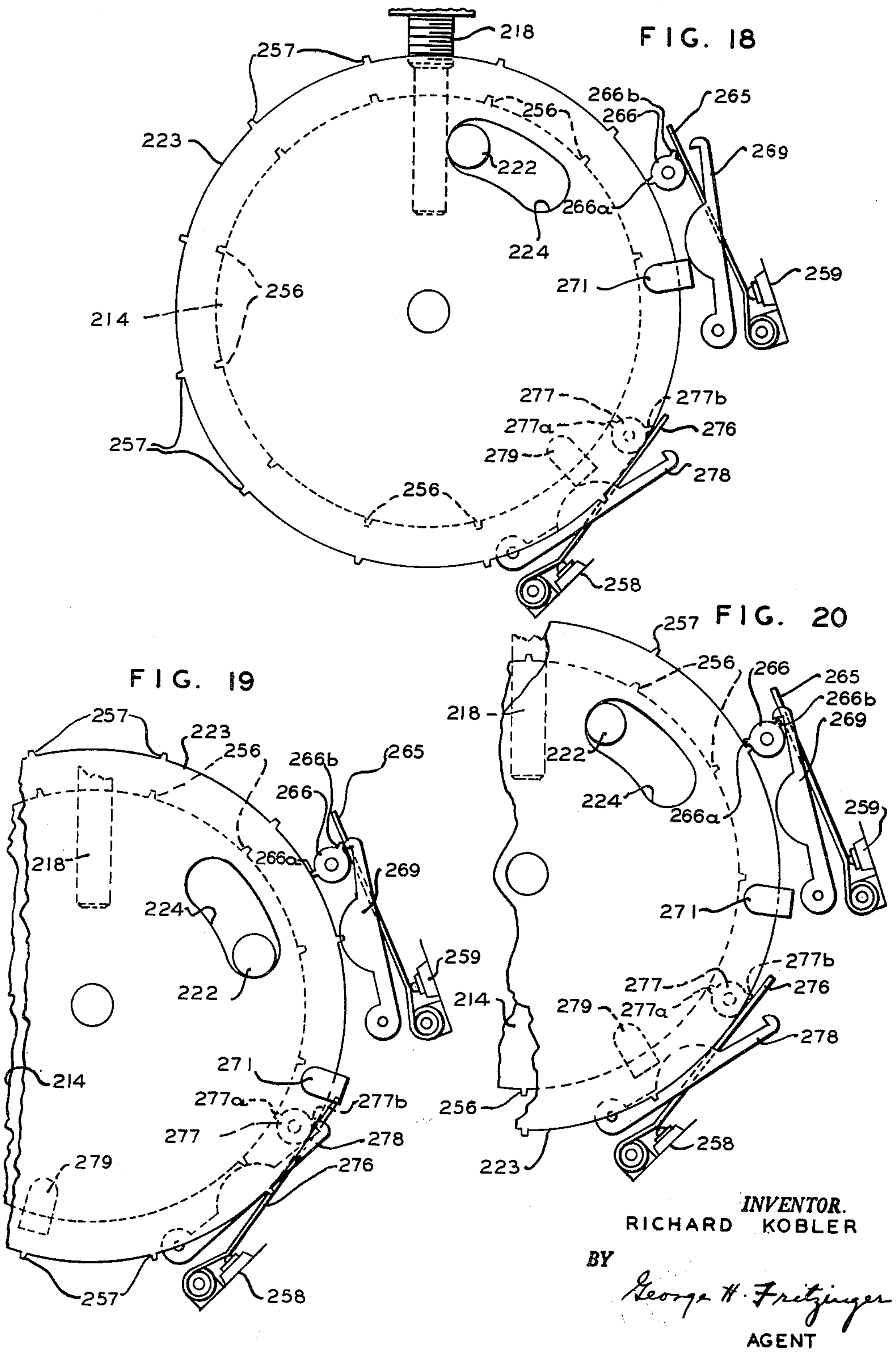
FIGURE 18 is a view of the motor and oscillator gears of the dial mechanism of FIGURE 11, showing the gears in the positions which they occupy when the dial is in home position.
FIGURE 19 shows the positions which the motor and oscillator gears occupy when the dial has been moved clockwise through two space intervals to the position for dialing digit 1.
FIGURE 20 shows the positions which the motor and oscillator gears occupy when the motor gear is 50 milliseconds, during the return of the dial, from home position.

The telephone dial 199 has the usual finger holes 200 and finger stop 201. The dial is secured at 203 to a shaft 204 journaled in spaced upper and lower bearings 206 supported respectively in upper and lower parallel plates 207 and 208 of a U-shaped frame 209 shown in FIGURES 11 and 13. The cast frame has a leg 210 with a foot portion 211 secured to the base plate of the machine. A sleeve 212 on the central portion of the shaft 204 is locked thereto by a roll pin 213. A gear 214 is keyed to the sleeve by pins 215 integral with a collar 216 on the shaft 204. This is a so-called motor gear because it controls the switch of the drive motor 144. A drum 217 is rotatable on the sleeve 212 but held stationary to the frame 209 by means of a horizontal stud bolt 218 threaded through the end wall of the frame 209 and engaging a hole in the drum (FIGURES 10 and 13). A coil spring 219 in the drum is secured at its inner end to the sleeve and at its outer end at 221 to the drum. This spring returns the dial to home position each time the dial is released. The home position is defined by abutment of an upright pin 222 on the motor gear against the stud bolt 218 shown in FIGURE 13. Above the sleeve 212 and drum 217 is a second gear 223 rotatable on the shaft 204. This is a so-called oscillator gear because it controls a switch in the oscillator circuit. This gear is coupled to the motor gear 214 by a lost motion coupling formed by the pin 222 extending through an elongate slot 224 in the oscillator gear (FIGURES 13 and 19). When the dial is at home position the oscillator gear may stand in any position within its range of lost motion coupling with the motor gear.

Figure 17:
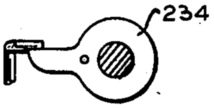
FIGURE 17 is a section on the line 17—17 of FIGURE 16.
Figure 11:
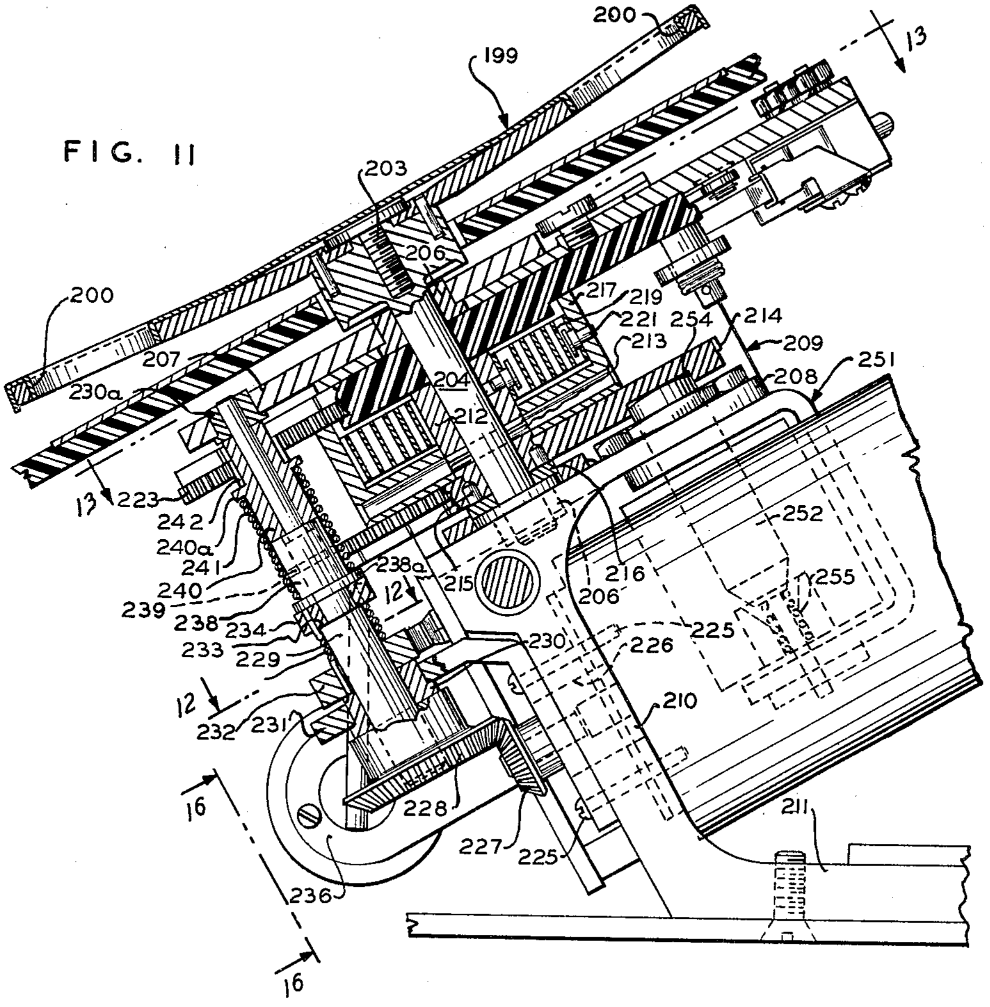
FIGURE 11 is a right-hand view to enlarged scale of the dial mechanism shown in FIGURE 1, with parts in section substantially on the line 11—11 of that figure.
Figure 12:
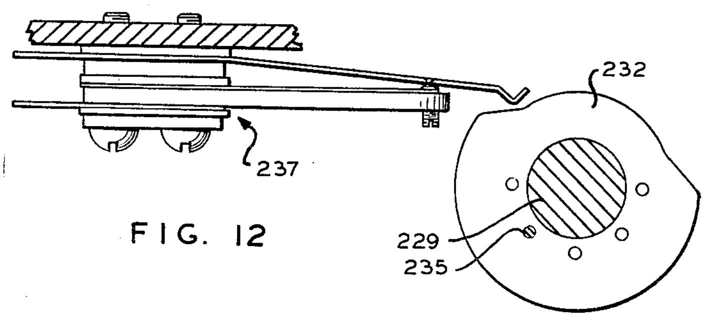
FIGURE 12 is a section on the line 12—12 of FIGURE 11.

The motor 144 is mounted on the backside of the leg 210 of the frame 209 by screws 225 (FIGURE 11). The shaft of the motor extends through a clearance hole 226 and has a beveled gear 227 mounted thereon which meshes with another bevel gear 228 secured to the lower end of an upright shaft 229. The shaft has a larger diameter lower portion journaled in a bearing 230 mounted in an L bracket 231 secured by screws 225 to the front side of the leg 210. Rotatable on the shaft above the bearing is a cam 232 (FIGURE 12). Above the cam the shaft 229 has a shoulder 233. Rotatable on the shaft against this shoulder is a dog 234 having a shape as shown in FIGURE 17. The dog and cam are interconnected by a one-way clutch spring 235 embracing the shaft 229 in such direction that when the dog is held against being rotated the frictional engagement of the shaft with the clutch spring is released but that when the dog itself is released the cutch spring grips the shaft and locks the cam thereto. The dog is normally held at standstill to prevent the cam from turning by a dial solenoid 236. The instant the dog is released the cam is turned with the shaft to intermittently operate a switch blade of a dial pulse switch 237 shown in FIGURE 12. This dial pulse switch 237 is operated only during playback to produce the dialing pulses which are fed into the telephone line to make the desired calling connection.

On the shaft 229 above the dog 234 there is a sleeve 238 locked to the shaft by cross pin 239. Rotatable on the shaft 229 above the sleeve 238 is a second sleeve 240 of the same diameter. These sleeves have flanges 238*a* and 240*a* at their outer ends for confining therebetween on the sleeves a clutch spring 241. Integral with the sleeve 240 above the flange 240*a* is a pinion gear 242 meshing with the oscillator gear 223 and above this gear is a bearing 230*a* in the frame plate 207 for the shaft 229. The clutch spring 241 is wound in such direction that the clockwise rotation of the shaft 229 by the motor 144 as appears in FIGURE 13 tends to release the spring from the sleeve 238, and the counterclockwise rotation of the sleeve 240 during the windup of the dial tends also to release the spring 241 from this sleeve. On the other hand, during return of the dial from an operated position the clutch spring grips the two sleeves to lock one to the other. The return spring 219 is adapted to return the gear 223 at a faster speed than the motor will allow it to return through the clutch spring 241 and as a result the motor acts as a brake on the return spring 219 and controls the speed of unwind of the dial.

Figure 15:
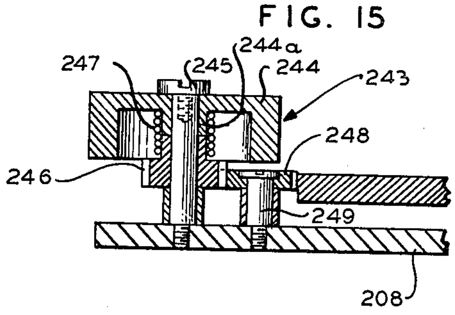
FIGURE 15 is a section on the line 15—15 of FIGURE 13.

During windup of the dial, the slack if any in the coupling between the motor and oscillator gears is first taken up and then the two gears are moved in unison by the engagement of the pin 222 of the motor gear against the clockwise end of the slot 224 in the oscillator gear. Upon release of the dial the motor gear is at first moved quickly in a counterclockwise direction through the distance allowed by the lost motion coupling with the oscillator gear but is from then on restrained by the return speed allowed the oscillator gear by the motor 144 as above explained. In order that the return of the dial will not be at first unduly fast before the lost motion coupling is taken up, a governor 243 is provided on the motor gear during the return thereof to home position as shown in FIGURES 13 and 15. The governor comprises a flywheel 244 journaled on a stud 245. The flywheel has an internal hub 244*a* coupled by a one-way clutch spring 247 with the hub of a pinion gear 246. The gear 246 meshes with a gear 248 on a stud 249 to couple the flywheel to the motor gear 214. The direction of wind of the clutch spring 247 is such that during windup of the dial the clutch spring opens up to uncouple the dial from the flywheel but during return of the dial the clutch spring couples the flywheel to the motor gear.

Mounted on the lower frame plate 208 at the left side of the motor 144 there is a dial-lock solenoid 251 shown in FIGURE 11. This solenoid has a plunger-type armature 252 which extends upwardly through a clearance hole in the frame plate 208. The upper end of this armature engages a recess 254 in the bottom face of the motor gear under influence of a backing spring 255 to hold the motor gear and dial normally locked. Thus, only when the solenoid 251 is energized to release the motor gear from its latched condition can the dial be operated.

The motor gear 214 has ten equally spaced teeth 256 corresponding respectively to the finger holes in the dial and, likewise, the oscillator gear 223 has ten equally spaced teeth 257 corresponding to the finger holes as shown in FIGURE 18. The regular teeth of the two gears have the same pitch but since the motor gear is smaller in diameter than the oscillator gear, the spaced teeth 256 of the motor gear are at intervals of ten regular teeth and the spaced teeth 257 of the oscillator gear are at intervals of 12 regular teeth. The spaced teeth of each gear have an overall peripheral span of 270° as shown in FIGURE 18. With respect to the time rate of return of the dial from an operated position, the spaced teeth are separated at 100 millisecond intervals. These spaced teeth are provided for the purpose of operating respectively the motor and oscillator switches 258 and 259 shown in FIGURE 18.

Figure 14:
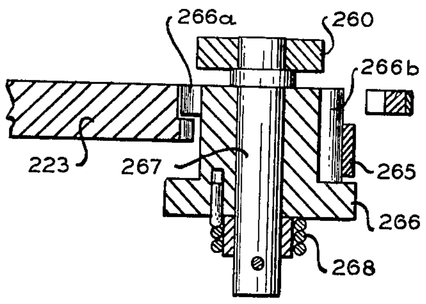
FIGURE 14 is a section on the line 14—14 of FIGURE 13.

The oscillator switch 259 is on a mounting arm 260 adjustable about the upper bearing 206 and is secured in position by a screw 261. Pivoted at 264 to a bracket held by screws 263 to the mounting arm is a lever 265 for operating the oscillator switch. Between the far end of this lever and the oscillator gear is a two lobe cam 266 journaled on a stud 267 staked to the underside of the mounting arm 260. The cam is centrally biased by a torsion spring 268 (FIGURE 14) into a mid-position wherein one lobe 266*a* engages the peripheral recesses of the oscillator gear and the other lobe 266*b* stands just counterclockwise from the switch lever 265. A latching pawl 269 for the cam is pivoted at 270 to the mounting arm 260.

When the oscillator gear is in home position a peripheral pin 271 thereon holds the latching pawl 269 disengaged from the cam. As the oscillator gear is turned clockwise by winding up the dial the latching pawl is released and the successive teeth 257 kick the cam in a counterclockwise direction but with no effect on the switch lever 265. When the finger reaches a stop position the cam 266 will be midway between two of the teeth 257 as shown in FIGURE 19. Upon release of the dial the first adjacent one of the teeth 257 clockwise from the cam 266 will engage the lobe 266*a* and kick the cam clockwise from a mid-position, causing the other lobe 266*b* to operate the switch lever 265. At the same time the lobe 266*b* is engaged by the latching pawl 269 to hold the oscillator switch in its operated position. As the oscillator gear nears the end of its return movement the pin 271 unlatches the pawl 269 and allows the oscillator switch to return to off position.

The actuating means for the motor switch 258 are substantially the same as that described above for the oscillator switch. This means is mounted on an arm 272 which is adjustable about the lower bearing 206 and which is held in adjusted position by a screw slot connecting means 273. The motor switch 258 is secured to the topside of this mounting arm by screws 274. The motor switch has an operating lever 276 pivoted at 275. Between the outer end of this switch lever and the motor gear is a two lobe cam 277 having one lobe 277*a* about midway between the first and last of the spaced teeth 256 as shown in FIGURE 18, and having a second lobe 277*b* just counterclockwise from the switch lever. The cam 277 is latched in operated position by pawl 278 which in turn is released by a peripheral pin 279 on the motor gear in the manner described above with respect to the oscillator gear. For example, when the motor gear is in home position the first of the teeth 256 is slightly less than one and one half space intervals counterclockwise from the cam 277 as shown in FIGURE 18. When during the windup of the dial the slack between the motor and oscillator gears has just been taken up as before described, the first of the teeth 256 and 257 stand at about one half space intervals counterclockwise from the respective cams. When the dial has been wound up by two space intervals—the distance for dialing the digit 1—they stand at about one half space intervals past the respective cams as shown in FIGURE 19. Correspondingly, when the dial is turned clockwise to any higher operate position the cams stand about midway between the respectively adjacent teeth 256 and 257. Upon releasing the dial from such operate position the motor gear first returns fast through one half space interval in about 10 milliseconds to operate the motor switch. The motor starts immediately and comes to speed in about 50 milliseconds. During about the first 10 milliseconds of this 50 millisecond start-up period the lost motion coupling between the gears is taken up and under the overdriving force of the return spring 219 the gears become locked to each other by the clutch spring 241 and are returned at a speed determined by the motor. About 60 milliseconds after this normal return speed is started the oscillator gear operates the oscillator switch. Thus, upon release of a dial from an operate position the motor is started in about 10 milliseconds, the motor reaches normal speed in about 50 milliseconds thereafter, and the oscillator is started about 10 milliseconds later.

When the motor gear comes within 60 milliseconds of home position during return of the dial the latch 278 is released by pin 279 and the motor switch is returned to off position. However, this does not now stop the motor but transfers control to an advance clutch 280 hereinafter described. About 10 milliseconds before the oscillator gear reaches home position the latch 269 is released by the pin 271 to allow return of the oscillator switch to off position. The oscillator gear may be moved further counterclockwise within the range of its lost motion coupling after the motor gear is stopped but this has no importance in the operation of the dialing mechanism.

The oscillator switch is held on for only about 40 milliseconds when the digit "1" is dialed, this being the time expiring from the instant the first of the teeth 257 has just operated the cam 266 (FIGURE 18) to the instant thereafter the peripheral pin 271 releases the latch 269. However, for each higher digit above "1" which is dialed, the time interval that the oscillator switch is held on is increased by 100 milliseconds. The motor 144 is kept running for about 500 milliseconds after the oscillator switch is returned to off position so that an interdigital space of this length will be provided on the record after each digit is dialed. This interdigital spacing is controlled by an advance clutch and switch device 280. The advance clutch 280 is mounted behind the home position of the carriage as shown in FIGURES 1, 8 and 9. It comprises a cylindrical housing 281 bolted through an annular plate 282 of magnetic material to the frame plate 5. A shaft 284 of this device extends through a clearance opening 283 in the frame plate and is journalled at its left end in a bearing 285 in the end wall of the housing 281 and at its right end in a bearing 286 in a yoke 287 secured by screws 287*a* to the right side of the frame plate 5. The shaft 284 extends through the left bearing 285 and is secured to a spiral spring 288 connected at its outer end to a cup 289 rotatably adjustable within a flanged collar 290 riveted at 291 to the housing 281. The cup is secured in adjusted position by a set screw 292. The shaft extends also through the right bearing 286 and has a cam 293 secured to the right end portion thereof. This cam, which is in the form of an arm provided with a roller on the end thereof, is held normally by the spring 288 against a stop pin 294.

The shaft 284 has a long bushing 295 thereon journaled via bearings 296, which extends through the right bearing 286. A large gear 297 is mounted on the bushing 295 at the right of the frame plate 5, the gear being secured to the bushing by set screw 298. This gear has a permanent drive connection with the motor 144 through the worm 143 meshing with the gear 142 on the shaft 141, a second gear 142*a* on shaft 141 meshing with a gear 335 on a short jackshaft 336 journaled between the frame plate 5 and the yoke 287, and a pinion gear 337 on the shaft 336 meshing with the gear 297. Within the housing 281 there is a clutch 302—304 for locking the bushing 295 to the shaft 284. The clutch member 302 is secured to the bushing by a key 303. The clutch member 304 is splined at 305 to the shaft 284. The magnetic annular plate 282 has a circular flange 282*a* housing a coil 306 which when energized draws the clutch member 304, itself also made of magnetic material, against the clutch member 302 to effect the coupling just mentioned. The motor 144 then drives the shaft 284 and the cam 293 thereon in correspondence with the movement of the head carriage.

On a hub 307 of the yoke 287 there is an annular plate 301 secured by screws 309 which supports at angular intervals about the shaft 284 a series of four switches 310 through 313 each having an operating lever referred to by the number of the switch with the suffix letter *a*. When the clutch 302—304 is engaged the cam arm 293 is turned clockwise to operate these switches at time intervals determined by the angular spacing of the switches from the zero position of the cam. For instance, as will appear, during the return of the dial from an operated position the advance clutch is actuated the instant the motor switch is returned to off position. This keeps the motor running until the cam 293 operates the first or interdigital switch 310, which is about 500 milliseconds after the oscillator switch is returned to off position. This provides the needed interdigital space on the record between successive time bands representing in code form the recorded digits of a telephone number.

If after the advance clutch switch 310 is operated, a control button 314 accessible only when the record button 65 is in on position, is depressed the motor is restarted to drive the carriage ahead to provide an additional 1450 millisecond blank space on the record. At the end of this period the cam arm 293 operates the second or "access" switch 311 to stop the motor, drop out the advance clutch solenoid and return the cam arm to zero position but the carriage still remains in its advanced position because the return solenoid 174 has not yet been operated. The access button is to be pressed only after a digit or digits have been dialed to make connection to a tie-line, the purpose being when such call is made to provide approximately two seconds delay to allow the automatic switching apparatus to reach the tie-line connection before the last four digits are dialed.

Figure 21:
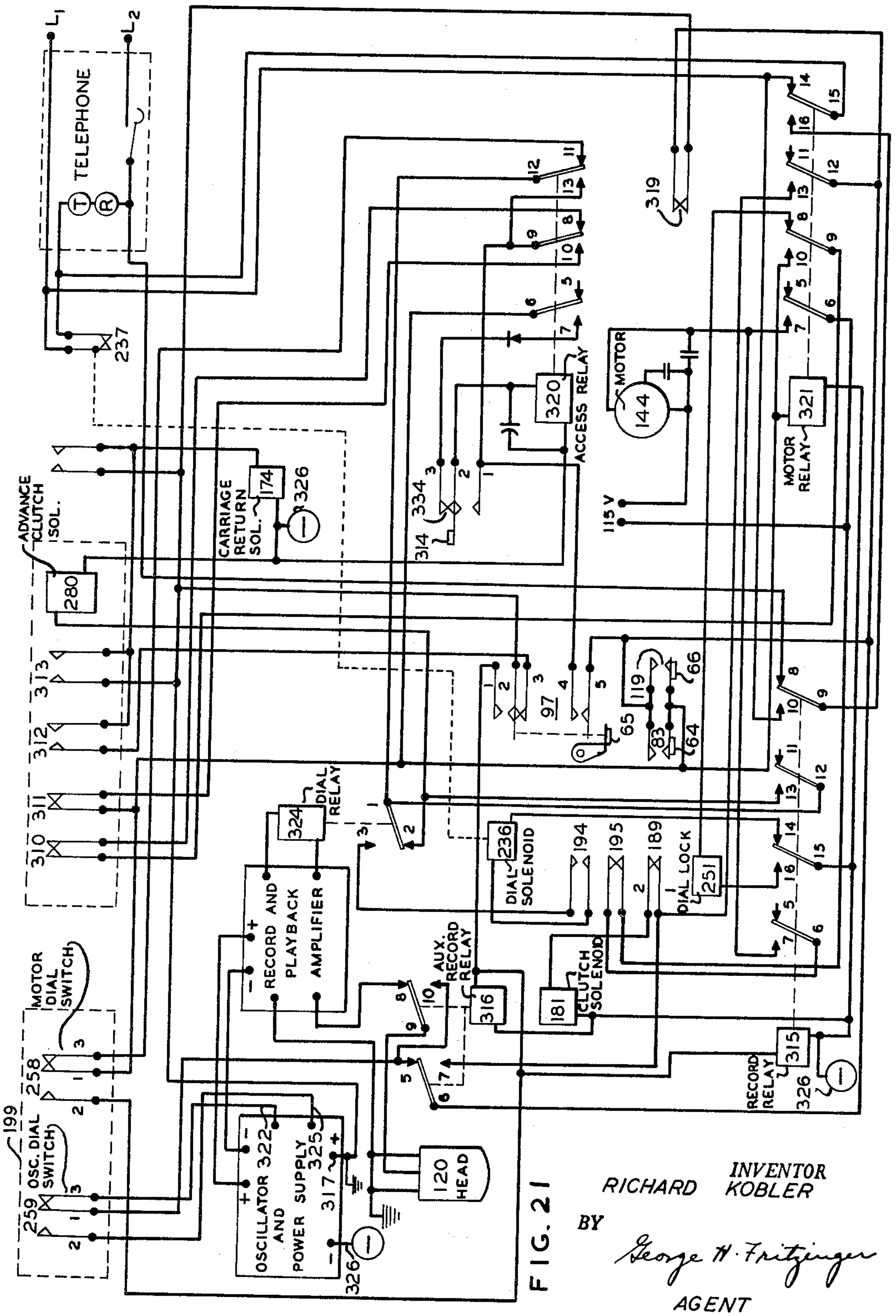
FIGURE 21 is a schematic circuit diagram of the machine.

If after dialing a telephone number the reset button 66 is depressed, the motor is restarted to move the advance clutch ahead and operate the fourth or reset switch 313 to provide an additional 2500 millisecond blank space on the record, after which the advance clutch is returned to zero position and the head carriage to home position. As will appear, when the head enters any blank space on the record of 5 to 10 milliseconds' duration during reproducing, the advance clutch is activated but the only switch thereof now active is the third or playback switch 312 set at 2250 milliseconds from zero position. All interdigital spaces on the record are less than this setting except spaces formed when the reset button is pressed which vary from 2500 to 3000 milliseconds. As a result, during playback, the advance clutch will be activated during each interdigital space but when a reset space is encountered the advance clutch is held operated until the playback switch 312 is operated. Operation of this switch returns the carriage and advance clutch to their home positions and stops the motor. The operation of recording and reproducing telephone numbers is next described in detail with reference to the schematic circuit diagram in FIGURE 21.

When the machine is in standby condition the dial mechanism is locked by the dial lock solenoid 251, the record button 65 is in off position, the reset button 66 is in off position, the carriage 121 is in home position under influence of the spring tension drum 158, and the access button 314 is concealed by the record button 65. The record switch 97 stands now in the position which it occupies in FIGURE 21. Contacts 1 and 2 of this switch are open to maintain a record relay 315 and auxiliary record relay 316 in unoperated positions. Contacts 2 and 3 are closed to permit energization of the carriage return solenoid 174. Contacts 4 and 5 are open to disconnect ground fror the first interdigital switch 310 of the advance clutch.

Upon pressing the record button, contacts 1 and 2 of the record switch 97 are closed to supply current from the negative terminal 326 through the record and auxiliary record relays 315 and 316 via the ground connection 317. Contacts 4 and 5 of the record switch are closed to operate the dial lock solenoid 251 to a released position, the operation being by circuit running from ground 317, a safety switch 319 held closed when the record or reproduce controls are operated, contacts 9 and 8 of access relay 320, the first interdigital switch 310, contacts 9 and 8 of a motor relay 321 and contacts 16 and 15 of the record relay 315 through the dial lock solenoid to negative terminal 326. The motor relay 321 is held operated through contacts 4 and 5 of the record switch, contacts 9 and 8 of access relay 320, first interdigital switch 310 and contacts 9 and 10 of the motor relay itself.

When the dial is wound clockwise to an operate position and released, the motor dial switch 258 is operated as before described, opening contacts 1 and 3 thereof to remove connection of the ground terminal 317 from the advance clutch solenoid 280 and prevent the advance clutch from being operated while the motor dial switch is operated. The closing of contacts 1 and 2 of the motor dial switch 258 activates the motor relay 321 from ground terminal 317 through contacts 2 and 1 of the record switch 97, contacts 2 and 1 of the motor dial switch 258 and through the motor relay 321 to the negative terminal 326. Operation of the motor relay starts the motor 144 through contacts 6 and 7 and starts forward drive of the carriage but the recording of a time band does not start until the oscillator dial switch 259 is subsequently operated. As the motor relay 321 is operated it obtains a holding circuit from the ground terminal 317, switch 319, contacts 4 and 5 of the record switch 97, and contacts 9 and 8 of the access relay 320, the first interdigital switch 310 and contacts 9 and 10 of the motor relay. Contacts 8 and 9 of the motor relay are opened to disconnect the dial lock solenoid 251 from its source of power, thereby allowing its locking armature to bear slidably against the bottom face of the motor gear and cause the gear to become locked again when the gear reaches home position.

As before described, the oscillator dial switch 259 is operated and latched about 60 milliseconds after the motor dial switch is operated. The opening of contacts 1 and 3 of the oscillator switch disconnects the head 120 from a 400 cycle erase current source 322 and the closing of contacts 1 and 2 of the oscillator dial switch connects the head to a 200 cycle signal-current source 325, thereby causing the recorder head to start recording a time band on the record. After an elapse of about 40 milliseconds when digit "1" is dialed, or about 140 milliseconds when digit "2" is dialed, etc., the oscillator dial switch 259 is returned to off position to connect the head 120 back to the 400 cycle source of erase current whereby to terminate the time band on the record. The motor however continues to run and move the carriage progressively ahead under control of the advance clutch, as before explained. For instance, the opening of contacts 1 and 2 of the motor dial switch removes the initial circuit through which the motor relay was operated but the relay stays held by its holding circuit through contacts 9 and 10 and the first interdigital switch 310. The return of the motor dial switch 258 activates the advance clutch solenoid 280 from the ground terminal 317 through switch 319 contacts 4—5 of record switch 97, contacts 8—9 of access relay 320, interdigital switch 310, contacts 9—10 of motor relay 321, contacts 1—3 of motor dial switch 258, contacts 11—12 of access relay 320, contacts 1—2 of the dial relay 324, and solenoid 280 to negative terminal 326. Both the motor relay and the advance clutch solenoid are now operated through the first interdigital switch 310. The resultant energization of the advance clutch solenoid starts the advance clutch running the instant the motor dial switch is returned to off position. The advance clutch is thus operated until it opens the first interdigital switch 310—which is about 500 milliseconds after the oscillator dial switch has returned to off position. Operation of the interdigital switch 310 drops out both the motor relay and advance clutch solenoid causing the motor to stop and the cam arm 293 to be returned to zero position with resultant reclosing of the interdigital switch 310. Thus, a 500 millisecond blank space is provided on the record after the dialing of each letter or digit and then the motor is stopped but the carriage is yet held in its advance position because the return solenoid 174 is not yet operated. The return of the motor relay 321 closes its contacts 8—9 to actuate again the dial lock solenoid 251 and free the dialing mechanism for dialing another digit of a telephone number. Thus, in accordance with the invention, the dial mechanism is locked for about 500 milliseconds after return of the dial from an operated position, enforcing therefore an interdigital delay of the order of 500 milliseconds between the dialing of successive digits.

When after dialing a digit or digits of a telephone number the access button 314 is pressed the switch 334 is operated closing its contacts 1—2 and opening its contacts 2—3. The closing of contacts 1—2 operates access relay 320 from ground terminal 317 through safety switch 319, contacts 4—5 of record switch 97, contacts 1—2 of access switch 334 and through the access relay 320 to negative terminal 326. The resultant closing of contacts 6—7 of the access relay provides a holding circuit therefore through contacts 2—3 of the access switch and through the second interdigital switch 311. The opening of contacts 8—9 of the access relay disconnects the first interdigital switch 310 and permits operation of the advance clutch through to the second switch 311. The closing of contacts 9—10 of the access relay operates the motor relay 321 to start the motor, the circuit of the motor relay being from ground terminal 317 through safety switch 319, contacts 4—5 of record switch 97, contacts 9—10 of access relay and the second interdigital switch 311, the relay 321 and negative terminal 326. The instant the access relay is operated the advance clutch solenoid 280 is activated through contacts 4—5 of the record switch, contacts 12—13 of the access relay and contacts 1—2 of the dial relay 324. Thus, the advance clutch begins to measure the advance of the recorder head through to the operation of the switch 311 the instant the access switch is closed. By this means the head is advanced for 1450 milliseconds over and above the 550 milliseconds, from the point of drop out of the motor dial switch to provide an approximate 2 second blank space on the record during which the dial is locked by the dial lock solenoid. When the head has been advanced through this period, the cam arm 293 opens the interdigital switch 311 to drop out both the motor relay, which stops the motor, and the access relay 320. The dropping out of the access relay opens at its contacts 12—13 the circuit of the advance clutch solenoid 280 causing the latter to drop out and return the cam arm 293 to its initial position.

As is more fully explained in the aforesaid pending application, whether the access switch is held operated for a long or short period by the hand the motor relay 321 and the advance clutch 280 are kept activated until the second interdigital switch 311 is opened to disconnect power from the motor relay and from the access relay as well as from the advance clutch solenoid 280 through the contacts 12—13 of the access relay and contacts 1—2 of the dial relay 324. During all time when the access relay is so operated, the record relay 315 is not operated, causing the dial lock solenoid to remain in its released locking position by reason of the contacts 15—16 in its circuit being then open. After any such recording operation as abovedescribed, the machine is returned to neutral position by pressing the reset button 66 to operate the reset switch 119. This switch, which is in parallel with the playback switch 83, causes the motor relay 321 to be operated through the safety switch 319, and causes the advance clutch solenoid 280 to be operated through contacts 1—2 of dial relay 324, contacts 12—11 of access relay 320, contacts 3—1 of motor dial switch 258, reset switch 119 and safety switch 319. Upon the reset advance switch of the advance clutch being operated, which will occur when the head has been advanced 2500 milliseconds or more from the time the advance clutch is activated, the carriage return solenoid 174 is activated to shift the bail 169 upwardly to disengage the clutch and return the carriage to home position. Also, by means not herein necessary to describe but operated through the link 173 fractionally shown in FIGURE 2, the record switch 97 and reset switch 119 are return to their initial positions to deactivate the motor relay 321 and the advance clutch solenoid 280.

Upon pressing the playback bar 64 to close the playback switch 83 after the machine has been returned to a standby condition, the record dial is held locked by the dial lock solenoid 251. The closing of the playback switch 83 activates directly the motor relay 321 from the negative terminal 326 via the playback switch and the safety switch 319. Since the carirage is in home position holding the clutch switch 189 closed the solenoid 181 is operated through contacts 13 and 12 of the motor relay to engage the head 120 with the record and to clutch the carriage to the feed screw. Simultaneously, the motor 144 is started through contacts 6 and 7 of the motor relay to start advancing the head 120 now operating as a reproducer. Also, at the same time, the advance clutch solenoid 280 is activated from terminal 317 through safety switch 319, dial switch 83, contacts 1 and 3 of the motor dial switch 258, contacts 11 and 12 of the access relay 320 and contacts 1 and 2 of the dial relay 324 to negative terminal 326, causing the advance-clutch cam 293 to be advanced in correspondence with the movement of the head. Since only the playback switch 312 of the advance clutch is now active the advance clutch is engaged and dropped out again by the reproducer head traversing the normal interdigital and the access time periods on the record.

When the reproducer head is traversing a recorded time band representing a digit or letter of a telephone number, the dial relay 324 is activated by the signals picked up from the record and closes its contacts 1 and 3. This activates the dial solenoid 236 from the ground terminal 317 through the safety switch 319, playback switch 83, motor dial switch 258, contacts 11 and 12 of the access relay 320, contacts 1 and 3 of the dial relay 324, mute switch 194, dial solenoid 236 and contacts 14 and 15 of the record relay 315 to negative terminal 326. Operation of the dial solenoid removes the stop 236*a* from the dog 234, causing the clutch spring 235 to lock up and start driving instantly the cam 232 at the fixed speed of one revolution per 100 milliseconds at which the shaft 229 is driven by the motor. Any momentary release of the dog will cause the cam to be driven for one whole revolution, causing the pulsing switch to be held open for 60 milliseconds and closed for 40 milliseconds to provide one dialing pulse. A suitable time duration for releasing the stop 236*a* from the dog and for allowing the stop to get back into blocking position before completion of one revolution of the cam is 40 milliseconds. Thus, there is recorded only a 40 millisecond time band on the record when the digit (1) is dialed. However, there are recorded additional time bands of 100 milliseconds for each additional digit. Thus, a first 40 millisecond time band will produce one pulse, a 140 millisecond time band will produce two pulses, etc.

When the reproducer head traverses an erased track of a reset duration the advance clutch is held engaged for a sufficient duration to cause the reproduce switch 312 to be operated by the cam 293. This activates the carriage return solenoid 174 through the contacts 2 and 3 of the record switch 97 to return the machine to standby condition.

The language herein used of providing a blank, unrecorded or erased space on the record is intended to means that such space does not have thereon any recorded digit- or letter-representing signals but may have thereon a recorded signal of a frequency substantially different from that of the digit- or letter-representing signals such as "erase" signal.

The particular embodiment of my invention herein shown and described is intended to be illustrative and not limitative of the invention since the same is subject to changes and modifications and other adaptations without departing from the scope of my invention, which I endeavor to express according to the following claims.

I claim:

1. In a telephone dialing mechanism: the combination of a rotatable dial operable in one direction by distances corresponding to selected letters or digits to be dialed; spring means for returning said dial to home position when the dial is released from an operated position; means for generating dialing signals corresponding to the letter or digit dialed as the dial is returned; means operative to lock said dial the instant the dial reaches home position; and timing means activated by said dial as said generating means is stopped for holding said locking means operative for a predetermined time interval.

2. The combination set forth in claim 1 wherein said timing means comprises a drive motor; control means for said locking means operable to unlock said dial; a movable operating member for said control means biased into a home position at a predetermined distance of travel from the control means; and means responsive to return of said dial from an operated position to home position for connecting said drive motor to said movable operating member to move the latter through said predetermined distance whereby to operate said control means and unlock said dial after a predetermined time delay following the return of said dial to home position.

3. The combination set forth in claim 1 wherein said locking means comprises a disk secured to the shaft of said dial having a smooth face provided with a latching hole and a latching plunger positioned to engage said hole when the dial is in home position, including means biasing said plunger into latching position and electromagnetic means energizable to withdraw said plunger into a non-latching position; said timing means including means for effecting a delayed energization of said electromagnetic means following return of said dial to home position.

4. In a telephone dialing mechanism; the combination of a rotatable dial operable in one direction by distances corresponding to selected letters or digits to be dialed; spring means for returning said dial to home position when the dial is released from an operated position; means for generating dialing signals corresponding to the letter or digit dialed as the dial is returned; means rendered operative upon release of said dial from an operated position for recording said dialing signals on a record medium during return of said dial to home position; timing means for maintaining said recording means in operation for a predetermined interval after each return of said dial to home position to provide an unrecorded track of predetermined length following each recorded digit and letter; and means controlled by said recording means for locking said dial in home position during said predetermined interval.

5. The combination set forth in claim 4 wherein said timing means includes a control switch operable to stop said recording means; an operating member for said control switch spaced at a predetermined distance of travel therefrom; a clutch engageable by return of said dial to home position for connecting said operating member to the drive mechanism of said recording machine to cause said control switch to be operated after a predetermined time delay following return of said dial to home position; and means responsive to operation of said control switch for disengaging said clutch and returning said operating member to home position.

6. A machine for recording and reproducing coded telephone numbers including a dial mechanism having a dial operable from home position according to selected letters or digits to be dialed; means for returning the dial to home position when the dial is released and for generating dialing signals during such return according to the letter or digit dialed; a mechanism for recording said dialing signals on a record medium and for reproducing the dialing signals therefrom; record and reproduce control means for placing the machine respectively in record and reproduce conditions; and means coupled to said control means for locking said dial in home position while the machine is in reproduce condition.

7. The machine set forth in claim 6 wherein said machine is adapted to record said signals along predetermined tracks on the record medium including means effective when the machine is conditioned for recording for starting the machine responsive to release of the dial from an operated position; means responsive to return of the dial to home position for maintaining the machine running for a predetermined interval thereafter to provide an unrecorded track of predetermined length on the record following the recorded signals of each recorded letter or digit of a telephone number; and means for locking said dial in home position while said machine is running without recording any signal on the record medium.

8. The machine set forth in claim 7 including manual control means operative while the machine is conditioned for recording for starting said machine and causing the same to run without recording any signal on the record medium; and timing means rendered operative by said manual control means for stopping said machine after an unrecorded track of a length substantially greater than said predetermined length is provided on the record.

9. The machine set forth in claim 7 including reset control means operative when the machine is in recording condition and has completed a recording operation for starting the machine to cause the same to run for a preset time without recording any signal on the record medium, and to restore the machine to its start position on the record; and means for causing said dial locking means to be rendered operative from the instant said reset control means is operated until said record control means is next operated.

10. A machine for recording telephone numbers including a dial mechanism having a dial operable from home position according to selective letters or digits to be dialed, means for returning the dial to home position when the dial is released and for generating dialing signals during such return according to the letter or digit dialed, a mechanism for recording said dialing signals on a record medium, means operable to start said machine running, means operable to lock said dial in home position, and means controlled by said start means for rendering said locking means operative while said machine is running.

11. In a telephone dialing mechanism: the combination of a rotatable dial operable in one direction by distances corresponding to selected letters or digits to be dialed; spring means for returning said dial to home position when the dial is released from an operated position; means for generating dialing signals corresponding to the letter or digit dialed as the dial is returned; a recording machine including a record medium, a recording head connected to said generating means and a drive mechanism for providing a relative progressive movement between said record medium and head; means for starting said drive mechanism responsive to release of said dial from an operated position; and means for operating said drive mechanism for a predetermined interval after return of said dial to home position to provide an unrecorded track of predetermined length on the record medium after each recorded letter or digit, comprising a control switch, an operating member for said control switch spring biased into a home position and having a lost-motion coupling with the control switch requiring the operating member to be moved through a predetermined distance to operate the switch, a clutch engageable to connect said drive mechanism to said operating member to cause said control switch to be operated a predetermined interval after said clutch is engaged, and means controlled by said control switch as the same is operated for stopping said drive mechanism and disengaging said clutch.

12. In a machine for recording coded telephone numbers: the combination of a record medium; a record head; means mounting said head and record medium for scanning movement of the head along respective tracks on the record medium; a drive mechanism for producing said scanning movement; and control means for producing selected scanning movements of predetermined lengths comprising a plurality of control switches and respective circuits, means for preparing said circuits selectively for stopping said drive mechanism by operation of said switches, said switches being positioned at predetermined distances along a given path, an operating member biased into a home position and movable along said path to operate said switches with different time delays according to the positioning of the switches along said path, a clutch engageable to drive said operating member at a predetermined speed by said drive mechanism to operate said switches, selective control means for starting said motor and engaging said clutch and for preparing a selected one of said control circuits, and means responsive to operation of said respective control switches for disengaging said clutch and returning said operating member to home position 13. In a machine for recording and reproducing coded telephone numbers comprising a record medium, a record-reproduce head mounted for movement across the record medium along selected tracks thereon, and a drive mechanism for producing a relative advance movement of said head to the record medium: the combination of a telephone dial for producing dialing signals representing letters and digits of telephone numbers; timing control means comprising interdigital, playback and reset control switches; a spring biased rotary cam for operating said switches at successively greater time intervals in the sequence named as the cam is moved from home position, and a clutch for coupling said cam to said drive mechanism; record, reset and reproduce controls for placing said machine respectively in record, neutral and reproduce conditions; means responsive to selected operations of said dial when said record control is in operated position for starting said drive mechanism to record the selected letter or digit, engaging said clutch when said recordation is completed, and causing thereupon said drive mechanism to be stopped by said interdigital switch of said timing means; means responsive to operation of said reset control following operation of said record control for starting said drive mechanism, engaging said clutch and disabling said interdigital and playback switches; means operable by operation of said reset switch for stopping said drive mechanism, disengaging said clutch and returning said head and record medium into their start relationship; means responsive to operation of said playback control for disabling said interdigital and reset switches, starting said drive mechanism and causing said clutch to be engaged during registration of said head with blank track spaces on the record and to be disengaged during registration with recorded track spaces on the record; and means responsive to operation of said playback switch for stopping said drive mechanism and restoring said head and record into their start relationship.

14. In a machine for recording and reproducing coded telephone numbers: the combination of a record medium; a record-reproduce head; means mounting said head and medium for relative movement of the head along selected tracks on the record; a drive mechanism for producing a relative progressive movement between said head and record medium along selected tracks thereof; a telephone dial for dialing signals representing digits and letters of telephone numbers; means responsive to release of said dial from an operated position for starting said drive mechanism to record the signals representing the digit dialed; and means for providing interdigital blank spaces of predetermined length in each track bearing a recorded telephone number and a longer blank space following the recordation of the last digit of the telephone number, comprising interdigital and reset measuring switches, a spring biased operating member for said switches having a lost-motion coupling with said switches requiring the operating member to be moved through respective predetermined distances to operate the switches, a clutch for coupling said operating member to said drive mechanism, means responsive to return of said dial to home position for engaging said clutch, record and reset controls for said machine, means responsive to return of said dial to home position while the machine is conditioned for recording for engaging said clutch, means responsive to operation of said interdigital switch for stopping said drive mechanism and disengaging said clutch to return said operating member to home position; means responsive to operation of said reset control for disabling said interdigital switch, starting said drive mechanism and engaging said clutch; and means responsive to operation of said reset switch for stopping said drive mechanism, restoring said head and record into their start relationship and disenaging said clutch.

15. The combination set forth in claim 14, including a playback switch interposed between said interdigital and reset switches; a reproduce control; means responsive to operation of said playback switch for diasabling said interdigital switch, starting said drive mechanism with said head operating as a reproducer, causing said clutch to be engaged only during scanning of blank spaces on the record medium, and rendering said playback switch operative for stopping said drive mechanism, disengaging said clutch and returning said head and record medium to their start relationship.

16. The combination set forth in claim 15 including means for locking said dial when the same is in home position and the machine is in reproduce and reset conditions, and means controlled by said record control and by said interdigital and reset switches for rendering said locking means operative while said machine is in recording condition and said drive mechanism is operating to produce said blank spaces on the record medium.

17. In a machine for recording coded telephone numbers: the combination of a manual dialing device selectively operable according to respective letters and digits of telephone numbers to be dialed; a recording machine including a record medium, a recording head and drive means for producing a relative progressive movement between said record medium and head; means responsive to a selective operation of said dialing device for starting said recording machine to record the selected letter or digit and to provide a predetermined unrecorded interdigital movement between the head and record medium without recording any letter or digit whereby to form signal-free spaces between adjacent letter or digit representing signals on the record medium; and means controlled by the recording machine for latching said dialing device against being reoperated until the recording machine is stopped.

18. In a machine for recording and reproducing coded telephone numbers: the combination of a manual dialing device selectively operable according to respective letters and digits of telephone numbers to be dialed; a recording and reproducing machine including a record medium, a record-reproduce head and drive means for producing a relative progressive movement between said head and record medium; means for selectively placing said machine in record- and reproduce-standby conditions; means responsive to a selective operation of said dialing device while said machine is in record-standby condition for starting said machine to record signals corresponding to the selected letter or digit and to provide a predetermined interdigital movement between the record medium and head wherein none of said signals are recorded thereon; means for starting said machine while the same is in a reproduce-standby condition for reproducing the recorded signal from the record medium representing a selected telephone number; and latching means for said dialing device operative when (1) said machine is running, and (2) said machine is in reproduce-standby condition.

19. In a machine for recording coded telephone numbers: the combination of a manual dialing device selectively operable according to respective letters and digits of telephone numbers to be dialed; a recording machine including a record medium, a recording head and drive means for producing a relative progressive movement between said record medium and head; means including timing means responsive to each selective operation of said dialing device for starting the recording machine to cause the same to record a signal representing the selected letter or digit and to provide a timed interdigital movement between the head and record medium without recordation of any letter- or digit-representing signal; means responsive to each selective operation of said dialing device for latching the same against reoperation; and means controlled by said recording machine for releasing said latching means as the recording machine is stopped.

References Cited in the file of this patent

UNITED STATES PATENTS

| | | |
|---|---|---|
| 1,164,626 | Adams | Dec. 21, 1915 |
| 1,454,496 | Vischer | May 8, 1923 |
| 2,953,647 | Johanson | Sept. 20, 1960 |